United States Patent Office 3,276,972
Patented Oct. 4, 1966

3,276,972
PROCESS FOR THE PREPARATION OF ERGOTAMINE AND ERGOTAMININE IN SUBMERGED CULTURE AND UNDER AEROBIC CONDITIONS
Alba Maria Amici, Anacleto Minghetti, Tullio Scotti, and Celestino Spalla, Milan, Italy, assignors to Società Farmaceutici Italia, Milan, Italy, an Italian corporation
No Drawing. Filed May 19, 1964, Ser. No. 368,741
Claims priority, application Italy, May 22, 1963, 10,448/63
3 Claims. (Cl. 195—81)

Our invention relates to a new fermentative process for the preparation of ergotamine and ergotaminine. More particularly our invention has as its object the production of ergotamine and ergotaminine in submerged culture and under aerobic conditions by using a new strain of *Claviceps purpurea* [Fr.] Tul.

The fermentative production of alkaloids of "secale cornutum" in an artificial nutritive medium has been studied for several years. A. Stoll et al. (U.S. Patent No. 2,809,920), McCrea (U.S. Patent No. 2,056,360), Abe et al. (J. Agric. Chem. Soc. Japan 25, 1952, p. 458), Taber et al. (Canad. J. of Microbiology 4, 1958, p. 611) and other authors have described the production of more or less complex mixtures of said alkaloids in saprophytic surface cultures, after 20–40 days of incubation, but they obtained rather low yields ranging about 25–70 mg./l. of broth culture. In consideration of these evident disadvantages, particularly the saprophytic surface culture and the low yields obtained, these processes do not seem to have been put into practice. Recently Windisch et al. (U.S. Patent No. 2,936,266) have described the production of complex mixtures of alkaloids consisting of ergotoxine, ergotinine, ergotamine, ergotaminine, ergosine ergosinine, ergometrine, ergometrinine and other alkaloids, in saprophytic culture either on the surface or submerged under practically anaerobic conditions causing thereby either a depression of the cellular respiration of the employed *Claviceps* Tul. or reduction of the redox potential in the substrate or addition of the reducing substances or poisons of the cellular respiration: these conditions and particularly the fact that complex alkaloid mixtures are obtained, represent some evident disadvantages.

It is the object of the present invention to show a way for producing high quantities of alkoids in submerged culture, under aerobic conditions and over a short period of time.

We have found a new strain of *Claviceps purpurea* [Fr.] Tul. which is capable of producing high yields of a mixture of ergotamine and of its isomer ergotaminine after 8–12 days of growing in submerged culture and under aerobic conditions.

By comparing the capacities of many strains of *Claviceps purpurea* it has been found that to obtain high yields of ergotamine the strain in submerged culture must be lacking of conidia, of clamidospores and of atrospores; furthermore it must form in submerged culture mycelium analogous to natural sclerotia.

In fact, the strains of *Claviceps purpurea* [Fr.] Tul. which generally may be found in nature, such as those described by Stroll et al. (above) and by Windisch et al. (above) produce conidia and practically do not produce ergotamine both under aerobic conditions and submerged culture.

Besides, the new strain described by the present invention, contrary to what was described by Windisch et al., does not produce ergotamine when cultivated under anaerobic conditions.

The high yields of production, the simplicity of the process, which may be carried out according to the usual industrial fermentations, and the fact that only the two isomer alkaloids, ergotamine and ergotaminine, are formed, are advantages of the present invention as a substitute for the extraction of ergotamine from ergot, i.e. from the natural sclerotia of *Claviceps purpurea* [Fr.] Tul. As is known from the literature (A. Stoll, Helv. Chim. Acta 28, 1945, p. 1283), the two isomer alkaloids ergotamine and ergotaminine differ one from the other for their chemical stereoisomery, ergotamine being a derivative of lysergic acid and ergotaminine a derivative of isolysergic acid.

The most evident difference is that ergotamine is laevorotatory and slightly soluble in lower aliphatic alcohols and acetone, while argotaminine is dextrorotatory and hardly soluble in the above-cited solvents. The transformation of the one isomer into the other one may easily be carried out because of the equilibrium existing between the two forms in solution and the achievement of the equilibrium may be accelerated by means of acids or bases.

The productive strain of the above-mentioned two alkaloids, which will be described hereinafter, is preserved by the laboratories of microbiology of Società Farmaceutici Italia (Milan), and designated as strain "F–1317/3" and the American Type Cluture Collection in Washington, D.C., where it has the index number 15383.

The strain has been obtained from sclerotia collected on Tritical (artificial hybrid between rye and wheat) at Porriño (Spain). The strain cultivated on nutritive agar containing asparagine, saccharose and mineral salts has the following morphologic characteristics: roundish colonies having 2–3 cm. of diameter with texture consisting of a compact sclerotial mass of 10–14$\mu$ diameter polygonal cells, which are perfectly identical to those found in natural sclerotia and full of fat droplets. The color of the 10–15 days aged colonies is white with violaceous reflexes. The color is darker at complete maturity. The aerial mycelium consists of normal short hyphae of 2–3$\mu$ diameter. Soluble pigment is absent in the young colonies. Older ones have a brown-violet, little diffusible pigment. The main properties of this strain in respect to all the other ones known consist in that the whole tissue of the colony is sclerotial. Sporulations have never been observed.

According to the present invention the new strain *Claviceps purpurea* [Fr.] Tul. described above is cultivated under aerobic conditions and in submerged culture, in flasks or fermentators of glass or other generally used materials, such as stainless steel, in a nutritive solution containing inorganic salts, an assimilable organic or inorganic source of nitrogen and an assimilable organic source of carbon until this solution shows to contain a considerable quantity of the two above alkaloids, which hereinafter will be simply called "crude ergotamine."

The inorganic salts used for the culture may be chlorides, nitrates, carbonates, sulfates, phosphates of alkaline metals, earth alkaline metals, copper or manganese.

The assimilable organic or inorganic source of nitrogen may consist of ammonium salts of organic acids, such as ammonium citrate, ammonium tartrate, ammonium malonate, ammonium malate, ammonium succinate, ammonium oxalate, ammonium acetate, or of amino acids and their mixtures, peptides and proteins, their hydrolysates, such as peptone and triptone, meat extracts, casein hydrolysates, hydrosoluble fractions of cereals, such as maize or wheat, residues of the distillation from alcohol production, or of yeast, leguminous meals, such as soya seeds, chick-peas, peanuts and also inorganic nitrates and inorganic salts of ammonium, guanidine, urea and indole.

The assimilable organic carbon source may consist of carbohydrates, such as glucose, saccharose, starch, dextrine, sorbite, mannite, lactose, arabinose, xylose, fructose, mannose and oils such as olive oil.

The culture is carried out under aerobic conditions and submerged culture, in flasks under stirring or in fermentors aerated with air or oxygen, optionally under stirring, at a pH ranging from 4.4 to 6, and preferably at 5.2, at a temperature ranging from 22° to 36° C., and preferably at 24° C.

The production of crude ergotamine beings after 1–2 days of growth and reaches the maximum after 8–12 days and during the period of the culture in submerged phase is preferably checked by colorimetric analysis with the Von Urk reagent.

The extraction of crude ergotamine is carried out in known manner both from the mycelium and from the culture broth separated from the mycelium. From the filtered mycelium the crude ergotamine is extracted with a water-miscible or immiscible organic solvent, such as methanol, ethanol, isopropyl alcohol, isobutyl alcohol, t-butanol, acetone, chloroform, methyl chloride, or ethyl ether. From the culture broth, isolated from the mycelium and made alkaline at pH 8–10, the crude ergotamine is extracted by one of the above-mentioned water-immiscible organic solvents. The crude ergostamine is transferred from the organic solvent into the aqueous solvent by extraction with an aqueous acidic solution, e.g. aqueous solutions of tartaric, malic, citric acid and others generally used for these purposes. The resulting aqueous solutions, containing the acid salts of crude ergotamine, are made alkaline and once more extracted with one of the above-mentioned water-immiscible organic solvents. By evaporation of the solvent, a residue is obtained, which by fractionated dissolution in an organic solvent, such as alcohols and lower aliphatic ketones, such as methanol, ethanol and acetone, separates into ergotamine which dissolves and ergotaminine which remains undissolved. Ergotaminine may be isomerized in ergotamine in known manner by treatment with acids.

The therapeutic properties of ergotamine are well known and it is used in gynaecology, in internal medicine and in neurology.

The following examples serve to illustrate, without limiting, the invention.

*Example 1*

The process was carried out in 500 cc. flasks containing 100 cc. of a suitable nutrient medium. The flasks were shaken by a rotary shaker (200 revolutions/minute; eccentric throw: 10 cm.). The optimal incubation temperature of 24° C. was met. The flasks were inoculated with the mycelium, which was obtained from a 10-days culture on potato-glucose-agar of the new strain of *Claviceps purpurea* [Fr.] Tul.

The nutrient medium was:

|  | Percent |
|---|---|
| Saccharose | 10 |
| Asparagine | 1 |
| Yeast extract | 0.01 |
| KH$_2$PO$_4$ | 0.03 |
| KCl | 0.015 |
| Cistein | 0.001 |
| Ca(NO$_3$)$_2$ | 0.1 |

Distilled water to 100%.

The pH was adjusted with dilute ammonia between 5.5 and 6.

The production of ergotamine began after 1–2 days of incubation and was checked by colorimetric analysis with the Von Urk reagent. After 10 days, the concentration of ergotamine was about 1000γ/cc. Ten liters of culture broth obtained from 110 flasks were filtered, filtrate and mycelium being extracted separately. The filtrate was made alkaline to pH 8–10 with a sodium carbonate or sodium hydroxide solution and extracted with 10 liters of chloroform. The organic extract was further extracted with a 2% aqueous tartaric acid solution. The aqueous acid solution was concentrated in vacuo at 20–40° C. to about one tenth of the starting volume. The concentrated solution was made alkaline to pH 8–10 and extracted with chloroform. The chloroform extract was combined with the mycelium extract as described hereinbelow.

The filtration cake consisting of mycelium was shaken with a 50–70% aqueous acetone solution containing 1–2% of tartaric acid. It was filtered and the filtrate was concentrated in vacuo at 20–40° C. to a small volume. The concentrated solution was made alkaline to pH 8–10 and extracted with chloroform. The organic extract was combined with the extract of the filtered broth culture mentioned above, and evaporated to dryness. 9 g. of crude ergotamine consisting of ergotamine and ergotaminine were obtained.

The same results were achieved when the filtration cake, consisting of mycelium, was extracted with a water-immiscible solvent such as chloroform, without addition of tartaric acid. The crude ergotamine was then extracted as a base from organic solvent.

*Example 2*

The growth was performed on the following culture medium:

|  | Percent |
|---|---|
| Glucose | 5 |
| Malic acid | 3 |
| Yeast extract | 1 |
| KH$_2$PO$_4$ | 0.1 |
| MgSO$_4$·7H$_2$O | 0.03 |

Distilled water to 100%.

The pH was adjusted to 5.2 with dilute aqueous ammonia. The fermentation was carried out according to the procedure described in Example 1. After 8 days of incubation, the production of ergotamine was 900γ/cc.

The same yields were obtained when tartaric acid, citric acid or succilinc acid was used instead of malic acid.

*Example 3*

The culture was prepared on the following culture medium:

|  | Percent |
|---|---|
| Saccharose | 5 |
| Succinic acid | 1 |
| KH$_2$PO$_4$ | 0.05 |
| MgSO$_4$·7H$_2$O | 0.03 |

Distilled water to 100%.
pH=5.2.

The pH was adjusted to 5.2 with dilute aqueous ammonia. The fermentation was carried out according to the procedure described in Example 1. After 11 days of incubation, the production of ergotamine was 910γ/cc.

The same yields were obtained if other nitrogen sources, such as soyabean meal, peanut meal, pea meal, hydrolysate of casein or corn-steep liquor, were used instead of chick-pea meal.

*Example 4*

The culture was carried out on the following culture medium:

|  | Percent |
|---|---|
| Mannitol | 4 |
| Glucose | 1 |
| Succinic acid | 2 |
| KH$_2$PO$_4$ | 0.1 |
| MgSO$_4$·7H$_2$O | 0.03 |
| Peptone | 1 |

Distilled water to 100%.

The pH was adjusted to 4.8 with dilute aqueous ammonia.

The fermentation was carried out according to the procedure described in Example 1. After 9 days of incubation, the production of ergotamine was 990γ/cc.

*Example 5*

2 g. of crude ergotamine obtained according to Example 1, consisting of ergotamine and ergotamine mixture were dissolved in 10–20 parts of warm acetone.

The undisolved part consisting of ergotaminine was filtered and treated separately as described hereinafter.

To the warm filtrate 10% of water was added with strong stirring, thereby causing an abudant crystallization of ergotamine base in prismatic crystals. Analysis revealed ergotamine containing 2 molecules of acetone of crystallization and 2 molecules of water of crystallization melting at 178–179° C. with decomposition.

A sample dried at 80° C. in vacuo to constant weight melted at 211–213° C. with decomposition.

$$[\alpha]_D^{20} = -160° \text{ (c.=1 in pyridine)}$$

The above undissolved part consists of ergotaminie which may be purified by crystalliaztion from methanol, obtaining thereby pure ergotamine, melting at 241–249° C. with decomposition. The method described by A. Stoll (Helv. Chim. Acta 28, 1945, page 1307) may be employed for the isomerization of ergotaminine to ergotamine.

One part of ergotaminine is dissolved into two parts of glacial acetic acid with mild heating. To the solution obtained, 6 parts by weight of methanol containing 0.6 part by weight of sulfuric acid are added. The crystallization is caused to start upon inoculating with some crystals of ergotamine sulfate and allowed to be completed for one day in the dark. Ergotamine sulfate, melting at 205° C. (with decomposition), is obtained.

*Example 6*

The growth was performed on the following culture medium:

| | Percent |
|---|---|
| Calcium nitrate ($Ca(NO_3)_2 \cdot 4H_2O$) | 0.1 |
| Magnesium sulfate ($MgSO_4 \cdot 7H_2O$) | 0.025 |
| Potassium dihydrogen phosphate ($KH_2PO_4$) | 0.025 |
| Potassium chloride (KCl) | 0.012 |
| Ferrous sulfate ($FeSO_4 \cdot 7H_2O$) | 0.0007 |
| Zinc sulfate ($ZnSO_4 \cdot 7H_2O$) | 0.0006 |
| Saccharose | 20 |
| Asparagine | 1 |
| Vegetable extract | 1 |
| Tap water to 100%. | |

The pH was adjusted to 5.2 with dilute hydrochloric acid. The incubation was carried out with shaking at a rate of 300 r.p.m. at 23° C., with an aeration rate of 6 liters per minute. After 12 days of incubation the production of ergotamine was 1450γ/cc.

*Example 7*

By carrying out the cultivation as in Example 6 but replacing the two components asparagine and vegetable extract with ammonium citrate, after 12 days of incubation the production of ergotamine was 1300γ/cc.

We claim:

1. A process for the biosynthetic production of a mixture of ergotamine and ergotaminine, which comprises culturing a strain of the genus Claviceps [Fr.] Tul., given American Type Culture Collection index Number 15383 in a nutrient medium, in submerged culture under aerobic conditions until ergotamine and ergotaminine is produced, and purifying ergotamine and ergotaminine contained in the mycelium and in the culture broth.

2. The process of claim 1, where the fermentation is carried out at a pH from 4.4 to 6, at a temperature of from 22° to 30° C., and for a period ranging from 8 to 12 days.

3. A process for the biosynthetic production of a mixture of ergotamine and ergotaminine, which comprises culturing the strain of *Claviceps purpurea* [Fr.] Tul., given American Type Culture Collection index number 15383, at a pH of about 5.2, a temperature of about 24° C. and for a period of from 8 to 12 days in submerged culture under aerobic conditions, extracting and purifying the ergotamine and erogtaminine contained in the mycleium and culture broth.

References Cited by the Examiner

UNITED STATES PATENTS

| | | | |
|---|---|---|---|
| 2,809,920 | 10/1957 | Stoll et al. | 195—81 |
| 3,038,840 | 6/1962 | Chain et al. | 195—81 |
| 3,110,651 | 11/1963 | Kybal et al. | 195—81 |

OTHER REFERENCES

Annual Review of Biochemistry, vol. 25, pages 246 to 249.

A. LOUIS MONACELL, *Primary Examiner.*

ALVIN E. TANENHOLTZ, *Assistant Examiner.*